United States Patent
Glassmeyer

[11] 3,861,648
[45] Jan. 21, 1975

[54] TWO-SPEED TRAILER LANDING GEAR SAFETY ARRANGEMENT

[75] Inventor: John J. Glassmeyer, Covington, Ky.

[73] Assignee: Pullman Incorporated, Chicago, Ill.

[22] Filed: Jan. 9, 1974

[21] Appl. No.: 432,014

[52] U.S. Cl.............. 254/86 R, 280/150.5, 285/3, 403/2
[51] Int. Cl........................... B60s 9/02, F16l 35/00
[58] Field of Search ........... 254/86 R; 403/2; 285/2, 285/3; 280/150.5

[56] References Cited
UNITED STATES PATENTS

| | | | |
|---|---|---|---|
| 2,249,848 | 7/1941 | O'Brien.................................. | 285/2 |
| 2,747,422 | 5/1956 | Walther............................ | 254/86 R |
| 3,182,956 | 5/1965 | Dalton.............................. | 254/86 R |
| 3,241,815 | 3/1966 | Hammond......................... | 254/86 R |

Primary Examiner—Al Lawrence Smith
Assistant Examiner—Robert C. Watson
Attorney, Agent, or Firm—Richard J. Myers

[57] ABSTRACT

A two-speed landing gear arrangement for high and low speed operation thereof including a landing gear drive shaft having a high speed detent position and a low speed detent position, a landing gear handle having a handle shaft in longitudinal abutting relation with the landing gear shaft, a coupler housing surrounding and slidably disposed in reciprocable relation on the abutting ends of the handle shaft and the landing gear shaft, the handle shaft having axially spaced drive dogs each mounted by a shear pin and respectively received in an opposed square interlocking recess in the outer end of the housing, said housing at the inner end thereof having a slotted portion with an inner end part in abutting relation with a fixed portion of the landing gear, the outer end of the landing gear shaft having an outer end including a landing gear pin therethrough in lost motion coupleable relation with the slotted portion and further including a slide portion outwardly of the pin cooperative with a reduced bore in the housing, a detent groove on the handle shaft outwardly of the drive dogs and cooperative with a detent means in the outer end of the housing for limiting longitudinal reciprocable movement of the handle shaft with respect to the housing during pulling out of the landing gear crank handle whereby pushing of the handle into the landing gear pushes the landing gear in low gear through the low gear shear pin in the low gear driving dog and pulling out of the landing gear crank handle causes high gear drive of the landing gear through the high gear shear pin in the high gear driving dog.

12 Claims, 4 Drawing Figures

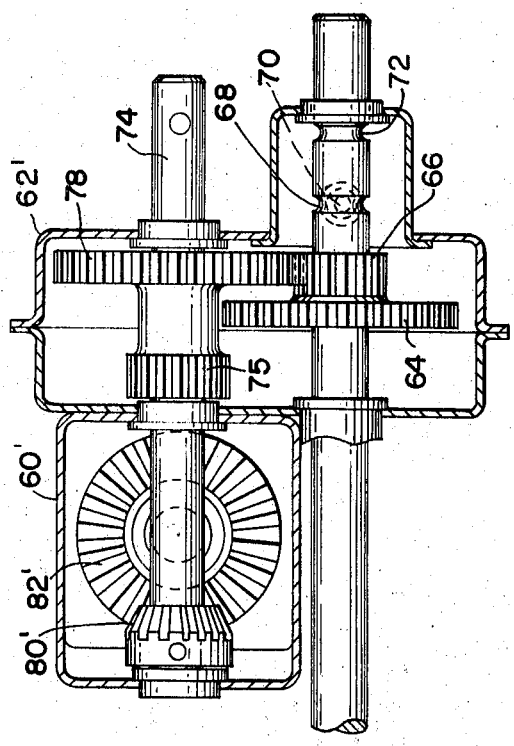
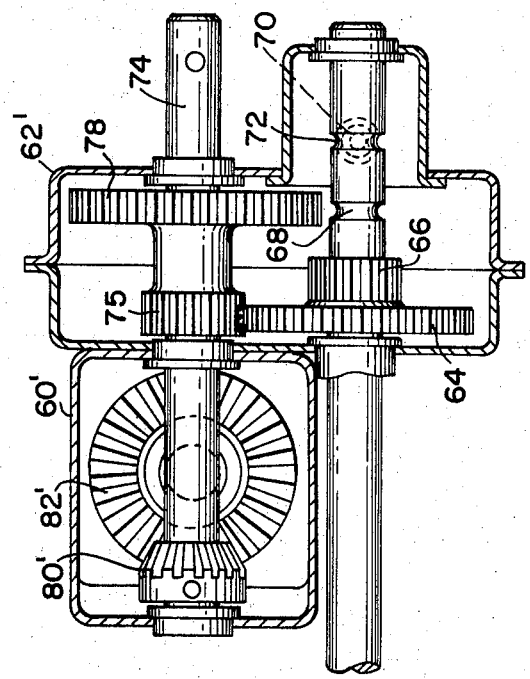
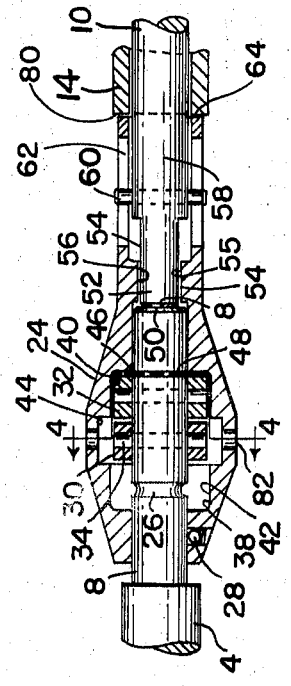
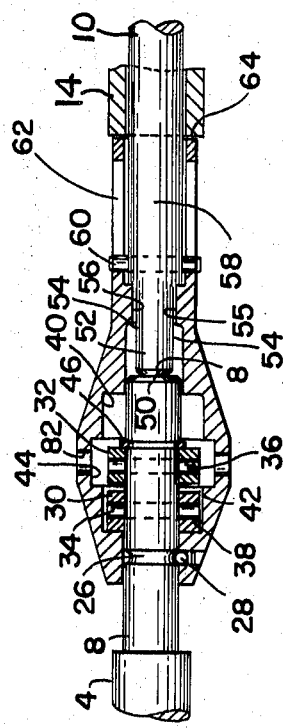

TWO-SPEED TRAILER LANDING GEAR SAFETY ARRANGEMENT

BACKGROUND OF THE INVENTION

1. Field of the Invention

The field of this invention relates to improvements in landing gear for trailers and more particularly to an improved two-speed gear drive arrangement for the landing gear.

2. Description of the Prior Art

It is known to use two-speed trailer landing gear arrangements having a high speed and a low speed manual shift. With such arrangements, it is not always possible to use a single external shear pin to protect the internal components of the gear box of the trailer landing gear from damage due to excessive input torque into the landing gear box. Particularly in cases where the low speed offers a high mechanical advantage and therefore a high magnification of the input torque, a shear pin that will protect the system in low gear will have such a small capacity that when high gear is engaged, the mechanism is incapable of doing useful work. This invention overcomes these difficulties and offers proper protection in both speeds. Landing gear arrangements for trailers are illustrated by U.S. Pat. Nos. 2,499,625 and 3,489,395. Two-speed landing gear arragements are shown in the prior art by such patents as U.S. Pat. Nos. 2,747,422 and 3,182,956. To the extent necessary to explain the operation of the invention disclosed herein the aforementioned patent references are hereby incorporated by reference thereto.

SUMMARY OF THE INVENTION

This invention has for its general object, advantage and purpose to provide proper protection in both high speed and low speed manual shift of a two-speed trailer landing gear arrangement.

A further object of the invention is to provide for proper protection in both of these speeds through the use of two shear pins of different capacities with the proper pin being automatically shifted into driving position when the gears are shifted from one speed to the other.

It is a further object of this invention to provide for a dual range automatic torque overload protection for the trailer landing gear of the two-speed shift type wherein the safety feature provided is a shear pin to take overload for each speed.

These and other objects, purposes and advantages will become apparent from reference to the following description, accompanying drawings and attached claims.

BRIEF DESCRIPTION OF THE DRAWINGS

FIG. 2 is a sectional view taken along line 2—2 of FIG. 1 and illustrates the landing gear being shifted into the low speed position;

FIG. 3 is a view similar to FIG. 2 but with the landing gear being shown shifted into the high speed position.

DESCRIPTION OF THE PREFERRED EMBODIMENT

Figure 1:
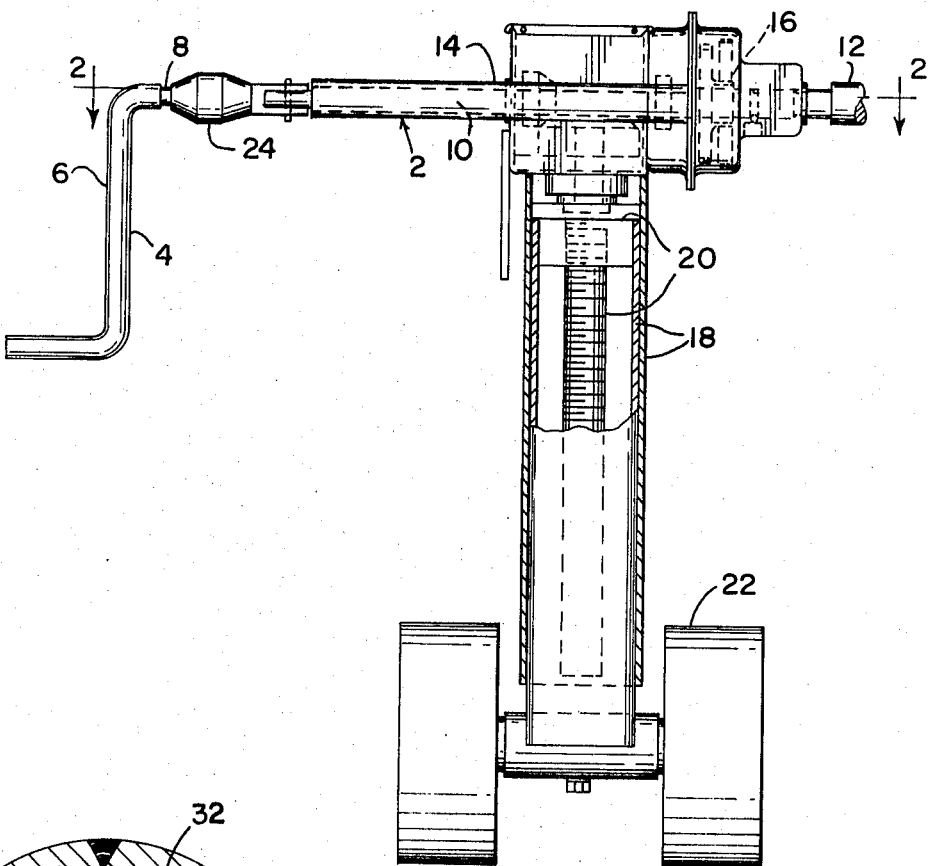
FIG. 1 is an end elevational view of a landing gear structure for a highway trailer.

With reference now to the drawings and in particular with reference to FIG. 1, there is shown a landing gear structure 2 or prop for a highway trailer. The landing gear structure includes a crank arrangement 4 having an L-shaped handle 6 fixedly connected to a handle shaft 8 which is attached to landing gear drive shaft 10 which is provided with a common power shaft 12 which couples with and drives the landing gear structure on the other side of the tractor which is not shown. The landing gear drive shaft 10 is channeled in the landing gear housing 14 within which is stored the landing gear transmission 16 and depending from the housing is the usual pair of depending telescoping tubes 18, the nut and screw drive arrangement 20, which cause raising and lowering of the landing gear wheel structure 22 upon rotation of the crank arm 6 as for instance is shown in U.S. Pat. No. 3,489,395.

For further operation of the landing gear arrangement see said patent.

Figure 4:
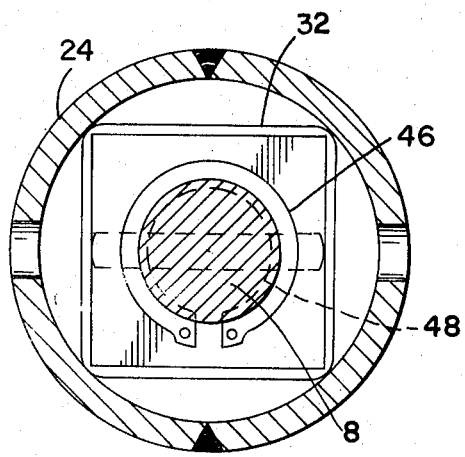
FIG. 4 is a sectional view taken along line 4—4 of FIG. 2.

The details of the construction of the inventive design are more clearly seen in FIGS. 2, 3, and 4, wherein it is seen that the handle shaft 8 and the landing gear drive shaft 10 are in substantially longitudinal horizontal axial alignment with one another and are surrounded by and coupled together by a coupler housing 24. The crank handle shaft 8, as best seen in FIGS. 2 and 3, is provided with a reduced portion or groove 26 which upon movement thereof is adapted to receive a detent engaging means shown as the spring loaded detent ball arrangement 28 and the coupler housing 24 in the preferred embodiment. Inwardly of the detent groove 26 and about the crank arm handle shaft 8, are mounted a pair of annular driving dogs 30 and 32. The driving dog or ring 30 is for high speed driving of the landing gear and driving dog or ring 32 is for low speed driving of the landing gear and each is held on the shaft 8 by respective pins 34 and 36. The driving dogs 30 and 32 are square-shaped on their outer perimeters for blocking a crank shaft against rotation when ultimately fitting into respective square-shaped groove sections 38 and 40 for high and low speed gear operation respectively. These groove portions or square recesses 38 and 40 form part of the housing bore 42 which also has an enlarged annulus or recess 44 between the square recesses 38 and 40. When one of the dogs 30 or 32 is centered within the enlarged annulus it cannot impart any driving connection between the shaft 8 and the coupler housing 24 while the other dog does have such a driving connection between shaft 8 and the housing 24. The shaft 8 is provided with a limit element or releasable catch, shown as a retaining ring 46 in its groove 48 in the preferred embodiment, whereby crank shaft 8 and the dogs 30 and 32 cannot be lost should both shear pins 34 and 36 become sheared off or broken.

The right end 50 of the crank shaft 8 butts against the outer or left end 52 of the landing gear shaft 10. It will be noted that this end 52 of the gear shaft has flats 54 on its sides to fit in reduced bore section flats 56 in housing bore 55 whereby rotation of the landing gear shaft 10 with respect to the coupler housing 24 cannot occur. Inwardly of this end 52 the shaft 10 has an enlarged circular portion 58 which has a pin 60 vertically extending therethrough that rides in slots 62 in the right end 64 of the coupler housing 24 whereby a lost motion connection is provided between the landing gear shaft 10 and the housing 24.

The landing gear transmission 16 is best seen in either FIG. 2 or FIG. 3 wherein there is provided housing or casing sections 60' and 62'. The landing gear shaft 10 is channeled in the housing 62' and carries the enlarged high speed drive gear 64' and the smaller low speed drive gear 66 adjacent to the high speed drive gear and to the right of it. The shaft 10 is also provided with the positioning detent groove 68 which cooperates with the detent 70 for holding the shaft 10 in the low speed drive gear position. The shaft is also provided with the high speed detent groove 72 which is cooperative with the detent 70 to hold the shaft 10 in the high speed drive gear position as seen in FIG. 3. A stub-shaft 74 is parallel to shaft 10 and is above it in housing 62 and extends into housing 60' and carries on it cooperating high speed small size gear 75 and low speed large size gear 78. The stub-shaft 74 has gear 80' driving gear 82' which in turn drives the nut and screw drive arrangement 20. Thus by such a transmission arrangement the nut and screw drive arrangement 20 can be driven either in a low speed or a high speed.

In a two-speed trailer landing gear and other devices having a high speed and a low speed manual shift, it is not always possible to use a single external shear pin to protect the internal components of the gear box from damage due to excessive input torque. Particularly in cases where the low speed offers a high mechanical advantage and therefore a high magnification of the input torque, a shear pin that will protect the system in low gear will have such a small capacity that when high gear is engaged, the mechanism is incapable of doing useful work. The invention offers proper protection in both speeds through the use of two shear pins 34 and 36 of different capacities, with the proper pin being automatically shifted into driving position when the gears are shifted from one speed to the other. The high speed pin 34 is actually stronger than the low speed pin 36 and will not shear as easily as the low speed pin 36. When it is desired to shift from high gear to low gear, the operator pushes axially inward on the crank handle 6 of the crank arrangement or crank handle assembly 4, forcing the input shaft or handle shaft 8 toward the landing gear housing 14 and simultaneously pushing the low speed driving dog 32 into the square recess 40 in the coupler housing 24 of the head assembly and the high speed driving dog 30 into the neutral round recess 44. This is accomplished by the fact that the inner end 64 of the housing 24 butts against the end 80 of the landing gear housing 14 (See FIG. 2), permitting the axial movement of shaft 8 with respect to the housing 24. To shift from low gear to high gear (That is going from FIG. 2 condition to FIG. 3 condition) the operator pulls outward on the crank handle 6, pulling the input shaft 10 out of the landing gear leg housing 14 and simultaneously pulling the shaft 8 outward until the detent 28 snaps into the groove 26, at which instant the high speed driving dog 30 is in the square recess 38 in the housing 24 and the low speed driving dog 32 is in the neutral round recess or enlarged annulus 44. The handle assembly 4 is hanging on pin 60 at this time. Pushing the handle assembly 4 slightly inward engages the housing 24 with the flatted sides 54 of end shaft portion 52 of the landing gear drive shaft 10, the flats 56 in the bore 55 coacting with the flatted sides 54 prevent rotation of the shaft 10.

Thus it is seen that the detent 28 and the detent groove 26 hold together the upper housing 24 and the handle shaft 8 in horizontal movement. In going from high speed to low speed you really don't need the detent 28 and the detent groove 26, but the detent 28 does come out of the groove 26 and thus is reset for later use in the high speed gear position where the handle is pulled outward for high speed gear operation and thus the upper housing and the crank handle shaft are prevented from sliding relative to one another and preventing disalignment of the shaft 8 with the coupler housing 24 and its dogs 30 and 32.

Thus the function of the detent 28 keeps the high speed driving dog 30 in the square recess 38 when pushing the handle 4 inwardly.

A through hole 82 is provided in the housing 24 for driving out and replacing broken shear pins. The retaining ring 46 guards against loss of components in case both pin 34 and pin 36 are sheared off at the same time. There is merely a disc or snap ring that is placed in the groove of handle shaft 8. The advantage of the flats 54 is that they transmit the torque of the handle 6 into the gear box 16 without the pin 60 having to transmit any torque. It should be understood that the illustrations refer to high gear and low gear positions on landing gears as mounted on trailers like vans. For mounting methods different from this mounting, the stronger pin and the weaker pin can be interchanged.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A two speed landing gear comprising:
   a longitudinally shiftable landing gear drive shaft for high speed and low speed manual shift and having inner and outer ends,
   an outer rotatable and longitudinally reciprocable crank handle shaft for the landing gear having inner and outer ends with the inner end in longitudinal abutting relation with the outer end of the landing gear shaft,
   a coupler housing disposed over the abutting inner end of the handle shaft and the outer end of the landing gear shaft for longitudinal reciprocal movement and rotational movement with respect to said abutting shaft ends,
   said housing having an outer portion provided with outer and inner recesses separated by a central neutral recess,
   high speed and low speed shear pins mounted on the outer portion of the handle shaft and carrying high and low speed dogs for selective alternative coupling with their outer and inner recesses, and
   a lost motion connection between said landing gear shaft and said coupler housing,
   whereby axial to and fro movement of the handle shaft results in shifting of the landing gear between high speed drive and low speed drive.

2. The invention according to claim 1, and
   said landing gear shaft having a low speed detent means and a high speed detent means for positioning the landing gear drive shaft in a low speed position and in a high speed position.

3. The invention according to claim 1, and
wherein the inner and outer recesses are rectangular in shape and the high and low speed dogs are complementally rectangular shape to provide positive drive between the handle shaft and the coupler housing.

4. The invention according to claim 1, and
a detent engaging means in the housing engageable with a detent groove on the handle shaft for limiting longitudinal movement of and locating the handle shaft with respect to the housing.

5. The invention according to claim 4, and
said detent groove being on the outer end of the handle shaft and the detent engaging means being outwardly of the outer recess.

6. The invention according to claim 1, and
said lost motion connection including a lost motion pin on the outer end of the landing gear shaft and the housing having an inner portion having a slotted inner portion cooperative and coupling with the pin to provide for a longitudinal lost motion connection.

7. The invention according to claim 6, and
a detent engaging means in the housing engageable with a detent groove on the handle shaft for limiting longitudinal movement of and locating the handle shaft with respect to the housing.

8. The invention according to claim 1, and
a limit element on the handle shaft to entrap the dogs and the handle shaft within the housing.

9. The invention according to claim 1, and
flat surface means on the outer end of the landing gear shaft and flat surface means on the housing inwardly of the recesses cooperative with the shaft flat surface means to provide for rotational movement of the landing gear shaft with the coupler housing and the handle shaft.

10. The invention according to claim 9, and
a lost motion pin on the outer end of the landing gear shaft and the housing having an inner portion having a slotted inner portion cooperative and coupling with the pin to provide for a longitudinal lost motion connection.

11. A two speed landing gear comprising:
a longitudinally shiftable landing gear drive shaft for high speed and low speed manual shift and having inner and outer ends,
an outer rotatable and longitudinally reciprocable crank handle shaft for the landing gear having inner and outer ends with the inner end in longitudinal abutting relation with the outer end of the landing gear shaft,
a coupler housing disposed over the abutting inner end of the handle shaft and the outer end of the landing gear shaft for longitudinal reciprocal movement and rotational movement with respect to said abutting shaft ends,
said housing having an outer portion provided with outer and inner recesses separated by a central neutral recess,
high speed and low speed shear pins mounted on the outer portion of the handle shaft and carrying high and low speed dogs for selective alternative coupling with their outer and inner recesses, and
a lost motion connection between said landing gear shaft and said coupler housing,
whereby axial to and fro movement of the handle shaft results in shifting of the landing gear between high speed drive and low speed drive,
a detent engaging means in the housing engageable with a detent groove on the handle shaft for limiting longitudinal movement of and locating the handle shaft with respect to the housing,
a lost motion pin on the outer end of the landing gear shaft and the housing having an inner portion having a slotted inner portion cooperative and coupling with the pin to provide for a longitudinal lost motion connection,
a limit element on the handle shaft to entrap the dogs and the handle shaft within the housing, and
flat surface means on the outer end of the landing gear shaft and flat surface means on the housing inwardly of the recesses cooperative with the shaft flat surface means to provide for rotational movement of the landing gear shaft with the coupler housing and the handle shaft.

12. A two speed landing gear arrangement for high and low speed operation thereof including:
a landing gear drive member having a high speed detent position and a low speed detent position,
a landing gear handle having a handle shaft in abutting relation with the landing gear drive member,
a coupler housing surrounding and disposed in reciprocable relation on the handle shaft and the landing gear drive member,
the handle shaft having axially spaced high speed and low speed drive dogs each mounted by a shear pin and respectively received in an opposed interlocking recess in the outer end of the housing,
said housing at the inner end thereof having an end portion with an inner end part in abuttable relation with a fixed portion of the landing gear,
the outer end of the landing gear drive member having an outer end including a landing gear portion therethrough in lost motion coupleable relation with the housing end portion and further including a slide portion cooperative with a reduced bore in the housing for constrained rotation therewith, and
a releasable catch on the handle shaft outwardly of the drive dogs and cooperative with a catch member in the outer end of the housing for limiting longitudinal reciprocable movement of the handle shaft with respect to the housing during pulling out of the landing gear handle whereby pushing of the handle into the landing gear member pushes the landing gear arrangement in low gear through the low gear shear pin in the low gear drive dog and pulling out of the landing gear handle causes high gear drive of the landing gear through the high gear shear pin in the high gear drive dog.

* * * * *